US008040884B2

(12) United States Patent
Arunachalam et al.

(10) Patent No.: US 8,040,884 B2
(45) Date of Patent: Oct. 18, 2011

(54) CONSTRAINING MULTICAST TRAFFIC BETWEEN A LAYER 2 NETWORK DEVICE AND A ROUTER

(75) Inventors: Senthil Arunachalam, Fremont, CA (US); Sundher Narayanaswamy, San Jose, CA (US); Isidoros Kouvelas, Redwood City, CA (US); Ishan Wu, Cupertino, CA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 791 days.

(21) Appl. No.: 11/198,999

(22) Filed: Aug. 8, 2005

(65) Prior Publication Data
US 2007/0030817 A1 Feb. 8, 2007

(51) Int. Cl.
*H04L 12/54* (2006.01)
(52) U.S. Cl. ........................................... 370/390
(58) Field of Classification Search .................. 370/226, 370/238, 389, 390
See application file for complete search history.

(56) References Cited

U.S. PATENT DOCUMENTS

| | | | | |
|---|---|---|---|---|
| 6,195,705 B1 * | 2/2001 | Leung | ............................ | 709/245 |
| 6,269,080 B1 * | 7/2001 | Kumar | ........................... | 370/236 |
| 6,331,983 B1 * | 12/2001 | Haggerty et al. | ............. | 370/400 |
| 6,341,127 B1 * | 1/2002 | Katsube et al. | ............... | 370/352 |
| 6,370,142 B1 * | 4/2002 | Pitcher et al. | ................ | 370/390 |
| 6,631,420 B1 * | 10/2003 | Li et al. | ......................... | 709/242 |
| 6,785,275 B1 * | 8/2004 | Boivie et al. | .................. | 370/390 |
| 6,807,172 B1 * | 10/2004 | Levenson et al. | ............ | 370/389 |
| 6,847,638 B1 * | 1/2005 | Wu et al. | ....................... | 370/389 |
| 7,031,320 B2 * | 4/2006 | Choe | ......................... | 370/395.31 |
| 2002/0167898 A1 * | 11/2002 | Thang et al. | ................... | 370/216 |
| 2003/0079040 A1 * | 4/2003 | Jain et al. | ....................... | 709/238 |
| 2003/0145102 A1 * | 7/2003 | Keller-Tuberg | ............... | 709/237 |
| 2005/0080901 A1 * | 4/2005 | Reader | ........................... | 709/226 |
| 2006/0146823 A1 * | 7/2006 | Ding | ............................. | 370/390 |
| 2006/0190589 A1 * | 8/2006 | Parker | ........................... | 709/224 |
| 2006/0221962 A1 * | 10/2006 | Previdi et al. | ................. | 370/390 |

OTHER PUBLICATIONS

Wu, I. and Eckert, T., RFC 3488, "Cisco Systems Router-Port Group Management Protocol", Feb. 2003, pp. 1-17.
Fenner, B. et al., draft-ietf-magma-msnip-05, "Multicast Source Notification of Interest Protocol (MSNIP)," Mar. 2004, pp. 1-26.

* cited by examiner

*Primary Examiner* — Gary Mui
*Assistant Examiner* — Ben Liu
(74) *Attorney, Agent, or Firm* — Campbell Stephenson LLP

(57) ABSTRACT

A method, system, computer program product and apparatus are presented to enable a L2 network device, such as a bridge or switch, to control the flow of a multicast data stream to a connected router in response to control messages received from the router by the L2 network device. By controlling the flow of multicast data streams in this manner, there will be a corresponding reduction in wasted bandwidth due to unnecessary transmission of these multicast data streams and a reduction in processing overhead by the router due to analysis and dropping of unnecessary multicast frames. In one aspect of the present invention, the router can generate the control messages in response to receiving a data frame in a multicast data stream from the L2 network device. The router can determine whether a subscriber to that multicast data stream is connected downstream of the router and then transmit an appropriate control message to the upstream L2 network device, indicating whether the router does or does not have a downstream subscriber. In response to such a control message, the L2 network device can cease transmitting the multicast data stream to the router, if appropriate.

21 Claims, 9 Drawing Sheets

| Index | MAC (L2) Address | Port |
|-------|------------------|------|
| 1 | SMAC(120(1,1)) | 110(1) |
| 2 | SMAC(120(2,1)) | 110(2) |
| 3 | SMAC(120(2,2)) | 110(2) |
| 4 | SMAC(120(3,1)) | 110(3) |
| ... | ... | ... |
| P | SMAC(120(N,1)) | 110(N) |

210 — Index
220 — MAC (L2) Address
230 — Port

**Figure 2
(Prior Art)**

CONSTRAINING MULTICAST TRAFFIC BETWEEN A LAYER 2 NETWORK DEVICE AND A ROUTER

FIELD OF THE INVENTION

The field of this invention relates to information networks. Specifically, a method, system, and apparatus are presented to constrain a multicast data stream between an OSI Layer 2 network device and a router when there are no active receivers for the multicast data stream on the other side of the router.

BACKGROUND OF THE INVENTION

Today's network links carry vast amounts of information. High bandwidth applications supported by these network links include, for example, streaming video, streaming audio, and large aggregations of voice traffic. In the future, network bandwidth demands will increase. Certain applications, such as those that stream audio and video, can generate a large amount of network traffic due to sending such a transmission to multiple subscribers. In order to help decrease network traffic load due to such applications, multicast extensions to network protocols have been developed.

Multicast protocols enable multicast data stream transmission (i.e., one-to-many connections) by replicating a data packet in the multicast data stream close to the destination of that data packet, obviating the need for multiple unicast connections for the same purpose, thereby saving network bandwidth and improving throughput. Upon destination address (GDA) of the packet and determine whether subscribers to the multicast data stream are connected directly or indirectly to the network node. In a network providing multiple multicast sources for the same GDA, a network node can also examine the source of a packet and determine whether any subscribers to the multicast group and the specific source are connected directly or indirectly to the network node. The network node can then replicate the multicast data packet as needed and transmit the multicast data packet to any connected subscriber.

FIG. 1 is a simplified block diagram of a L2 network device 100 (e.g., a network switch or bridge). The L2 network device provides ports 110(1)-(N), wherein a network frame arriving at any port can be directed to any other port connected to the device as determined by an examination of the frame's destination address. Connected to each port are network elements 120(1,1)-(N,M). In a typical network environment, each network element 120(1,1)-(N,M) has a unique media access control (MAC) address. L2 network device switch 100 can learn the MAC addresses of network elements 120(1,1)-(N,M) as those network elements transmit frames to each other via the L2 network device. Each frame transmitted by a network element contains a source MAC address that L2 device 100 can read and associate with a port 110(1)-(N). Such element-port information is stored in an address table. Such a table has been called an L2 Address Table (referring to Layer 2 of the Open System Interconnection networking framework for implementing protocols, which is also called the data link layer) or a MAC Address Table.

FIG. 2 illustrates a L2 Address Table showing element-port associations of L2 network device 100. Each entry in the table has an associated index 210. The number of entries in the table can be equal to the number of nodes connected to L2 network device 100 (e.g., P). Each entry in the table contains a MAC address 220 that corresponds to a source MAC address found in frames transmitted by each network element (e.g., SMAC (120(1-1)) is the source MAC address for node 120(1,1)). Each L2 Address Table entry also includes a port 230 corresponding to the network element, wherein the association is made by L2 network device 100 when it receives a frame from the network element. Information linking a network element address with a particular port is related to the hardware of the network element (e.g., a network interface) and is typically static in a L2 Address Table, unless a network element is physically removed or moved from one port to another port on the L2 network device.

A L2 Address Table cannot automatically be populated with multicast subscriber destinations in the same way as element-port designations. This is because a multicast GDA cannot be a source MAC address. Portions of Layer 3 multicast GDAs are included in a L2 Address Table through the use of software protocols such as the internet group management protocol (IGMP). When a network element wishes to subscribe to a multicast transmission, a special IGMP protocol frame is transmitted as a multicast "join" request. An IGMP-enabled L2 network device will have "snooping" software running on the switch to read such a frame and build a corresponding entry for the L2 Address Table. Such an entry can relate a form of the multicast GDA with ports that are connected to subscribing network elements.

A port on a L2 network device can be coupled by a network link to a network router, which can then be subsequently coupled directly or indirectly to other network elements. Since one or more of those network elements can be a downstream subscriber for a multicast data stream, any port of an L2 network device 100 that is connected to the router will automatically receive all multicast data streams being transmitted through the L2 network device. Thus, a router connected to a L2 network device will always receive every multicast flow being transmitted through the L2 device.

In the past, a first router has been able to communicate with a second router between the first router and a multicast source whether the first router is connected to a subscribing destination for a multicast data stream from the source. Upon receiving a multicast data packet, the first router, upon verifying that it is not connected to any subscribers for that multicast flow, can send a "prune" message to the second router through a protocols such as Router Group Management Protocol (RGMP) or Protocol Independent Multicast (PIM) snooping. In RGMP and PIM snooping, upon receiving such a prune message, the second router will then no longer transmit multicast data packets for that stream to the first router. Through the use of such pruning, network bandwidth is conserved since fewer data packets are being transmitted on the network, and processing overhead on the first router is reduced since the first router no longer has to process packets for that multicast data stream. But such protocols are limited in that they limit multicast transmission based solely on the multicast group destination address, and do not provide the capacity to limit transmission based upon the source of the transmission.

Another protocol used to control multicast flooding is multicast source notification of interest protocol (MSNIP). MSNIP operates between a first-hop router and a source of a multicast transmission. The first-hop router informs the multicast source to transmit a multicast data stream only with the presence of a receiver. While MSNIP can control multicast flooding on a source-by-source basis, MSNIP requires a source-based component to respond to messages from the first-hop router.

Such pruning capability as described above for router-to-router communication and router-to-source communication has not heretofore been available for router-to-bridge (L2 device) communication. As stated above, an L2 network device transmits all multicast data streams on each port coupled to a router on that L2 device. For reasons such as conserving network bandwidth and decreasing processing overhead on a connected router, it is therefore desirable for the router to be able to inform the L2 network device, which is between that router and source of a multicast data stream that the router has no subscribers to multicast transmission from the source. It is further desirable for the L2 network device to then cease transmitting multicast data streams to that router from the indicated multicast source.

BRIEF DESCRIPTION OF THE DRAWINGS

The present invention may be better understood, and its numerous objects, features and advantages made apparent to those skilled in the art by referencing the accompanying drawings.

FIG. 2 illustrates a L2 Address Table showing element-port associations of an L2 network device such as that illustrated in FIG. 1.

DETAILED DESCRIPTION

Figure 1:
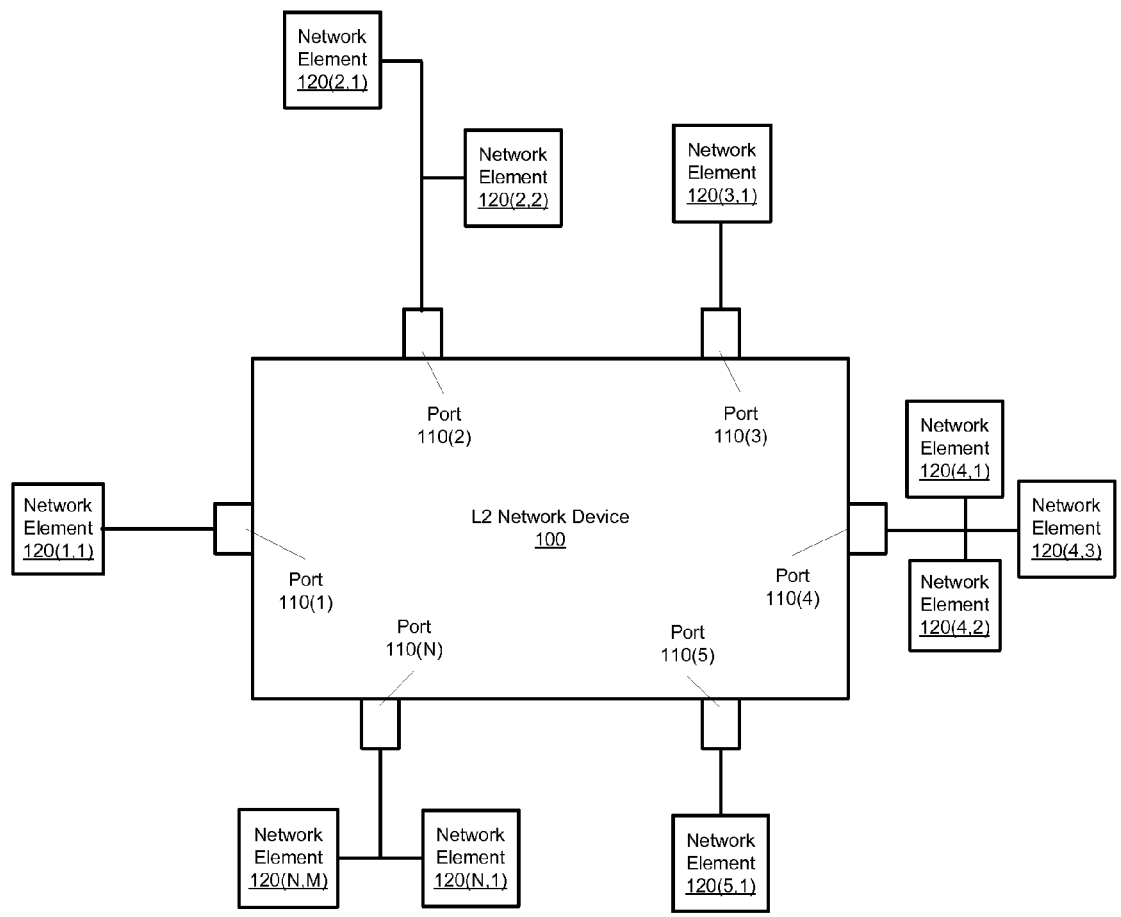
FIG. 1 is a simplified block diagram illustrating a L2 network device.

The present invention enables a L2 network device, such as a bridge or switch, to control the flow of a multicast data stream to a connected router in response to control messages received from the router by the L2 network device. By controlling the flow of multicast data streams in this manner, there will be a corresponding reduction in wasted bandwidth due to unnecessary transmission of these multicast data streams and a reduction in processing overhead by the router due to analysis and dropping of unnecessary multicast frames.

Certain L2 network devices currently have the capacity to selectively transmit multicast data streams to subscribers (through the use of protocols such as IGMP). A network protocol enabling a router to communicate to an L2 network device the presence or absence of a downstream multicast subscriber would give the L2 network device a similar selectivity capacity for that router. In one embodiment, control messages within such a protocol can be generated by a router in response to receiving a data frame in a multicast data stream from a connected L2 network device. In another embodiment, the router can examine the GDA, and optionally the source, of the multicast data stream to determine whether any subscriber to that multicast stream is connected downstream (where "downstream" of the router is away from the multicast source) of the router. Then the router can transmit an appropriate control message to the upstream L2 network device (wherein "upstream" of the router is toward the source of the multicast data stream). Such a control message can take the form of an "Edge Prune JOIN" ("EP JOIN") or an "Edge Prune PRUNE" ("EP PRUNE"), wherein the router informs the L2 network device that it either does or does not have a downstream subscriber to the GDA, and optionally the source, of the multicast data stream, respectively. Such a control message can, for example, be embedded in an IP multicast packet with a special IP multicast address. A control type within the control message can distinguish between an EP PRUNE, EP JOIN, or some other Edge Prune control message. Such control messages can be restricted to the subnet from which the multicast data stream originates.

In one embodiment of the present invention, control messages transmitted by a router can include an Edge Prune HELLO ("EP HELLO"), EP PRUNE, and EP JOIN. An EP HELLO can be generated by a router upon which an Edge Prune feature is enabled. The router will generate periodic EP HELLOs to inform upstream L2 network devices that the router is capable of supporting the multicast pruning feature. An EP PRUNE can be generated by the router when it determines that there are no receivers present downstream for a particular multicast group and, optionally, source. Such a PRUNE message can contain multicast group or source information (e.g., IP addresses), wherein that information is in an appropriate address form for the underlying network (e.g., IPv4 or IPv6). An EP JOIN can be transmitted by the router when it determines that a subscribing receiver is present or has been connected directly or indirectly to any of the router's downstream interfaces. Such an EP JOIN message can also contain multicast group or source information.

In one embodiment of the present invention, a router will transmit an EP PRUNE or an EP JOIN control message in response to receiving frames of a multicast data stream via an L2 network device. Such a data stream can be analyzed by the router for information regarding the source or group destination address of the multicast data stream. An EP PRUNE or EP JOIN can specify a multicast group destination address alone, which will result in transmissions from all sources in the group being pruned or passed on, or the EP PRUNE or EP JOIN can specify one or more sources in addition to the GDA, which will result in source-specific pruning or transmission by the L2 device.

In contrast, an EP HELLO will be transmitted by the router periodically to inform coupled L2 network devices that the router is capable of transmitting Edge Prune messages. Further, in one embodiment of the present invention, such EP HELLO messages can include security related information, such as passwords or tokens, that a receiving L2 network device can use to verify whether the message is coming from an authorized source.

Figure 3:
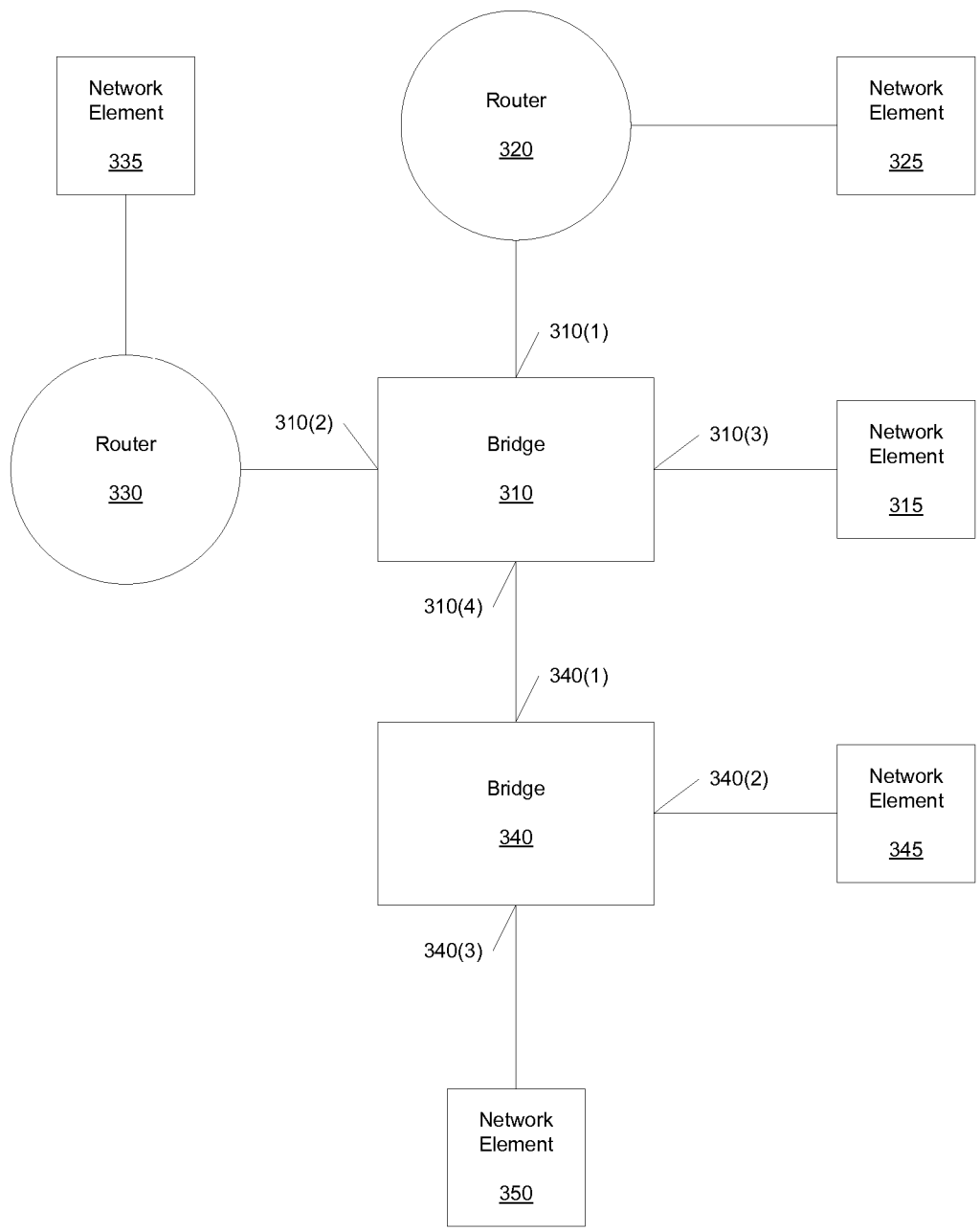
FIG. 3 is a simplified block diagram illustrating a network configuration within which an embodiment of the present invention can be employed.

FIG. 3 is a simplified block diagram of a network incorporating an embodiment of the present invention. Bridge 310 is an L2 network device including four ports 310(1-4). Port 310(1) is coupled to router 320 via a network connection, and router 320 is further coupled to a network element 325. Port 310(2) is similarly coupled to a router 330, and router 330 is further coupled to a network element 335. Port 310(3) is coupled to a network element 315. Port 310(4) is coupled to bridge 340 at port 340(1) of that bridge via a network connection. Bridge 340 is coupled to a network element 345 through port 340(2) and a network element 350 through port 340(3). In the current discussion, L2 network devices 310 and 340 are described as bridges, but other types of L2 network devices, such as switches, can be used. Network elements 325 and 335 are representative of all downstream network elements that can be coupled directly or indirectly to routers 320 and 330, respectively, including end nodes, L2 network devices, and router elements.

If network element 350 is a source of a multicast data stream, that multicast data stream arrives at port 340(3) and is subsequently transmitted to all ports coupled directly or indirectly to a subscribing network element for that multicast data stream, including 340(1) because that port is ultimately coupled to a downstream router. The multicast data stream is then received by port 310(4) of bridge 310. In the prior art, bridge 310 transmits the multicast data stream via ports 310 (1) and 310(2) to routers 320 and 330 respectively, regardless of whether routers 320 and 330 are coupled to downstream subscribers. Embodiments of the present invention incorporated into bridge 310, router 320 and router 330 can alter this response to a multicast stream provided by the prior art.

FIG. 3 will be used to describe a series of possible scenarios and the response that can be expected from embodiments of the present invention. In the first scenario, network element 325 represents all network elements connected to router 320. If network element 325 is not a subscriber to a multicast data stream transmitted by network element 350 (either the group or group and source), then router 320 can send an EP PRUNE message on the router port coupled to port 310(1). Upon receiving the EP PRUNE message, bridge 310 verifies that the EP PRUNE message is received from an authorized router (e.g., a router that has sent an EP HELLO message) and that the EP PRUNE is received on a port connected to a router. Upon such verification, bridge 310 can remove port 310(1) from the L2 Address Table entry corresponding to the multicast source or multicast group destination address to which the source is sending the multicast stream. Once removed, router 320 will no longer receive a multicast data stream from source 350. Bridge 310 will continue to send the multicast stream to all other ports coupled to subscribers to the multicast data stream, including port 310(2) which is connected to router 330. Bridge 310 can also broadcast the EP PRUNE received from router 320 to bridge 340. But bridge 340 will continue to transmit the multicast stream to bridge 310 because of other subscribers to the multicast data stream connected to bridge 310.

Should network element 325 subsequently become a subscriber to the multicast data stream from network element 350, then network element 325 will send a subscription request to router 320 (e.g., an IGMP-JOIN request). Router 320 can then send an EP JOIN control message to bridge 310. In response to the EP JOIN, bridge 310 can add port 310(1) to the list of subscribers for the multicast source or group destination address in the L2 Address Table. Bridge 310 can also broadcast the EP JOIN control message to bridge 340 for any action that may need to be taken by bridge 340.

In another scenario, network elements 315, 325 and 335 are not subscribers to a multicast data stream transmitted by network element 350. In response to receiving that multicast data stream, router 320 sends an EP PRUNE to bridge 310, as does router 330. To signal its nonsubscriber status to a multicast stream, network element 315 can send an IGMP-Leave control message to bridge 310. In response to these control messages, bridge 310 can remove ports 310(1), 310(2), and 310(3) from the list of ports connected to subscribing nodes in the L2 Address Table. Bridge 310 can broadcast the EP PRUNE control messages to bridge 340. In response to these EP PRUNE messages, bridge 340 can remove port 340(1) from a list of subscribing ports to the multicast stream that is maintained on bridge 340's L2 Address Table.

Another scenario illustrates the presence of two multicast transmission sources on the network. A first multicast data stream source can be network element 350 and a second multicast data stream source can be network element 315 (either transmitting to the same multicast group destination address or to separate group destination addresses). Network element 325 is not a subscriber to the multicast data stream from network element 350, but is a subscriber to the multicast data stream from network element 315. In response to receiving the multicast data stream from network element 350, router 320 can transmit an EP PRUNE message corresponding to that multicast data stream through the port on which the multicast data stream has been received. In response to the multicast data stream transmitted by network element 315, router 320 can send an EP JOIN through the port on which the multicast stream is received. Or if an EP PRUNE related to network element 315 has not previously been sent, then router 320 can send no message at all related to the multicast stream from network element 315, and rely upon the default behavior of bridge 310. In response to these messages, bridge 310 can remove port 310(1) from the list of subscribing ports for the multicast transmission from source network element 350. Bridge 310 can also add port 310(1) to the list of subscribing ports for the multicast stream from network element 315 if that port is not already a member of the list of subscribing ports.

Figure 4:
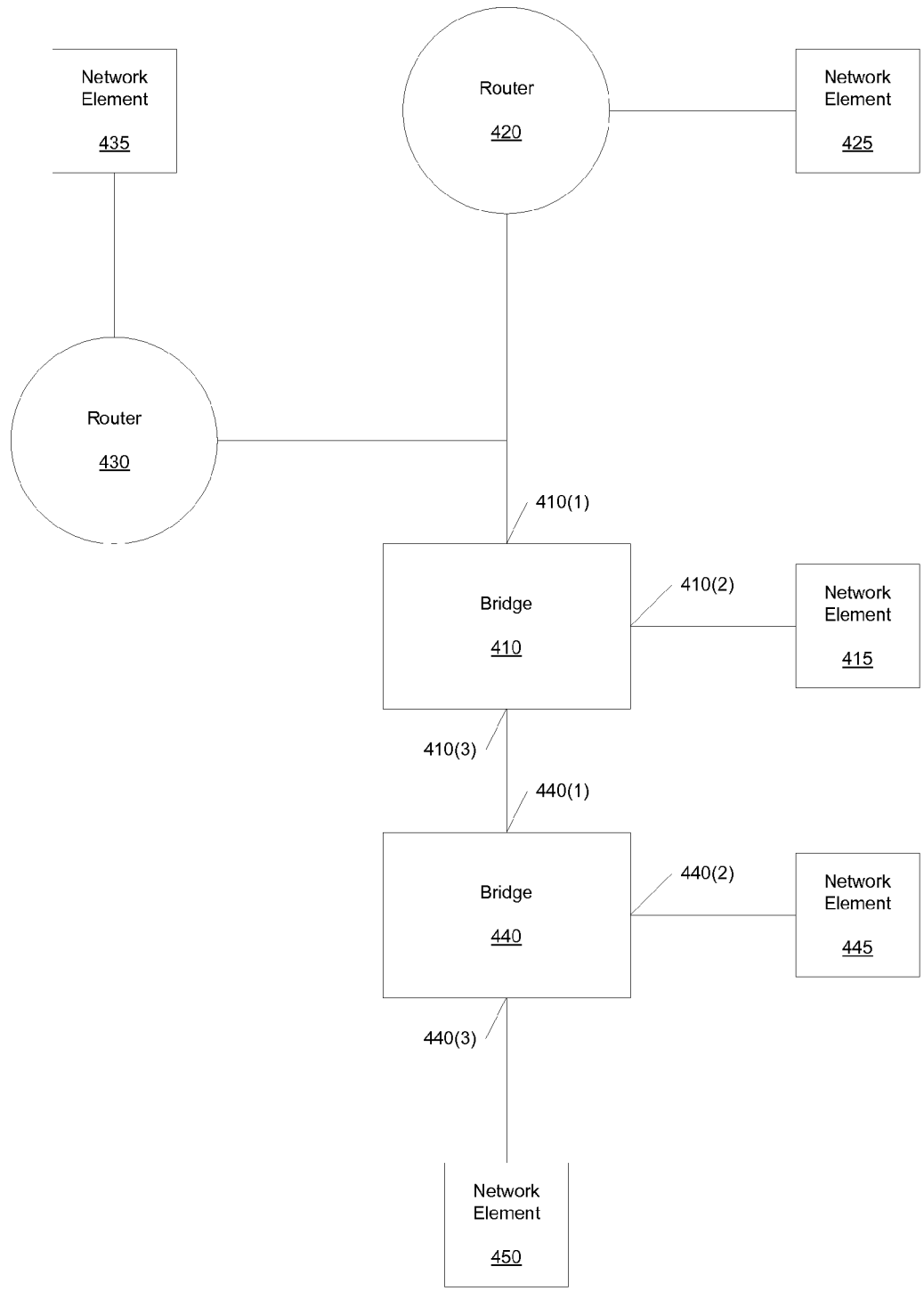
FIG. 4 is a simplified block diagram illustrating an alternate network configuration within which an embodiment of the present invention can be employed.

FIG. 4 is a simplified block diagram representing a network configuration within which an embodiment of the present invention can be employed. FIG. 4 is similar to FIG. 3 except that port 410(1) of bridge 410 is coupled to a both a router 420 and a router 430, which are connected to downstream network elements 425 and 435, respectively. That is, port 410(1) has two routers connected to it rather than one as shown in FIG. 3.

In a first scenario using the network configuration of FIG. 4, routers 420 and 430 are Edge Prune capable routers. Network element 425 (representing all network elements connected to router 420) is not a subscriber to a multicast data stream transmitted by network element 450. Network element 435 (representing all network elements connected to router 430) is a subscriber to a multicast data stream transmitted by network element 450. In response to receiving a frame in the multicast data stream from network element 450, router 420 sends an EP PRUNE message via the port on which it has received the multicast stream. Router 430, in response to receiving the multicast data stream, can send an EP JOIN message via the port on which that router receives the multicast data stream (or can merely default to receiving the multicast data stream). Bridge 410 can track the EP PRUNE messages received from each router on port 410(1). Since each router connected to that port has not sent an EP PRUNE message, bridge 410 will continue to list port 410(1) as a subscriber to multicast data streams from network element 450.

In another scenario using the network illustrated by FIG. 4, again both routers 420 and 430 are Edge Prune capable (and are therefore transmitting periodic EP HELLO messages). In this scenario, both network elements 425 and 435 are not subscribers to a multicast data stream transmitted by network element 450. In response to receiving a multicast data stream from network element 450, routers 420 and 430 send EP PRUNE control messages to bridge 410. Again, bridge 410 tracks EP PRUNE control messages received for each Edge Prune capable router on port 410(1). After receiving EP PRUNE messages from each router connected to port 410(1), bridge 410 removes port 410(1) from the list of subscribing ports in the L2 Address Table for the multicast source. If subsequently, for example, network element 435 sends an IGMP-Join request to router 430, router 430 can send an EP JOIN request to bridge 410. In response to such an EP JOIN message, bridge 410 adds port 410(1) to the list of subscribing ports for the multicast source, and both routers 420 and 430 will receive multicast data streams from that source.

In a further scenario using the network illustrated by FIG. 4, router 420 is Edge Prune capable, but router 430 is not an Edge Prune capable router (or is not an authorized Edge Prune router). In such a scenario, bridge 410 will track EP PRUNEs and EP JOINs received from router 420, but will not remove port 410(1) from the list of subscribing ports in the L2 Address Table until router 430 sends a valid EP HELLO and a subsequent EP PRUNE message. Should bridge 410 receive an EP PRUNE from router 430 without having received a prior EP HELLO control message, then bridge 410 can either drop the EP PRUNE control message or broadcast such a message to all ports on that bridge.

Figure 5:
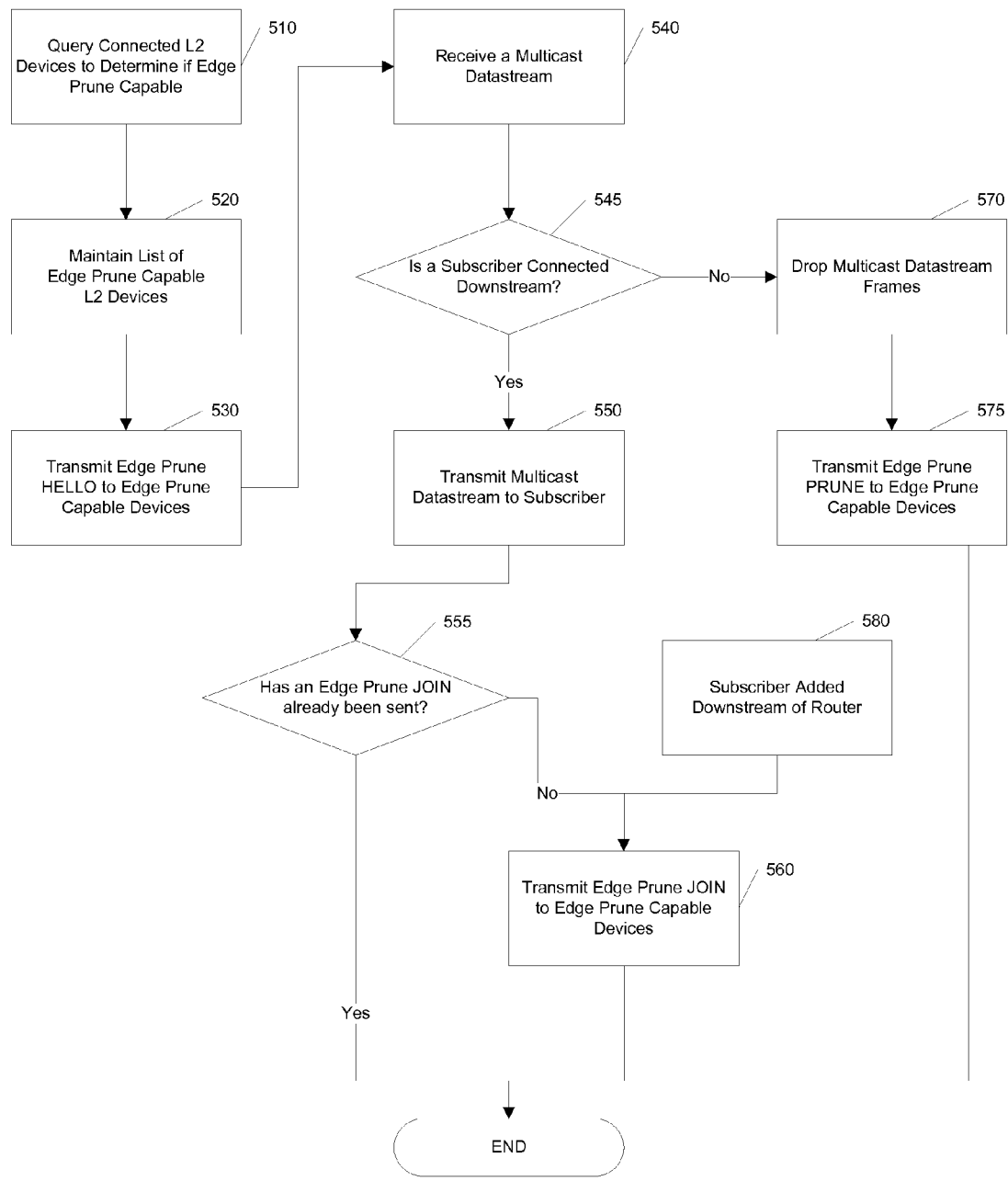
FIG. 5 is a simplified flow diagram illustrating a method of responding to multicast data streams in accord with one embodiment of the present invention.

FIG. 5 is a simplified flow diagram illustrating a method of responding to multicast data streams by an Edge Prune capable router in accord with one embodiment of the present invention. An Edge Prune capable router can maintain a list of connected L2 network devices that can respond to Edge Prune messages sent by the router. The router can query connected L2 network devices to determine if they are Edge Prune capable (510). The router can enter the identity of confirming respondents into the list of Edge Prune capable L2 network devices (520). The router can transmit an EP HELLO to all Edge Prune capable devices, if Edge Pruning is enabled on the router (530). In an alternative embodiment, the router can broadcast EP HELLO messages to all connected L2 network devices without prior tracking whether these devices are Edge Prune responsive.

If the router receives a multicast data stream (e.g., multicast frames or packets) from a source (540), it can determine if a subscriber for that multicast data stream is coupled downstream of the router (545). Such a determination can be made by examining the multicast group destination address alone or coupled with an examination of the identity of the source of the multicast data stream. If a subscriber is coupled to the router, the router can transmit the multicast data stream to the subscribing network element (550). The router can also verify whether it has already sent an EP JOIN control message to upstream Edge Prune capable L2 network devices (555). If the router has already sent an EP JOIN, then it need take no further action beyond transmitting the multicast stream to appropriate subscribers. If the router has not previously sent an EP JOIN, then the router can transmit an EP JOIN upstream.

If the router determines that no multicast subscribers are coupled downstream of the router (545), then the router can drop the multicast data stream (570) and transmit an EP PRUNE message to upstream L2 network devices (575). In the event that a network element that subscribes to multicast transmissions from a previously pruned source is added to the router (580) (e.g., a network element transmits an IGMP JOIN message), then the router can transmit an EP JOIN message to upstream L2 devices coupled to the router.

Figure 6:
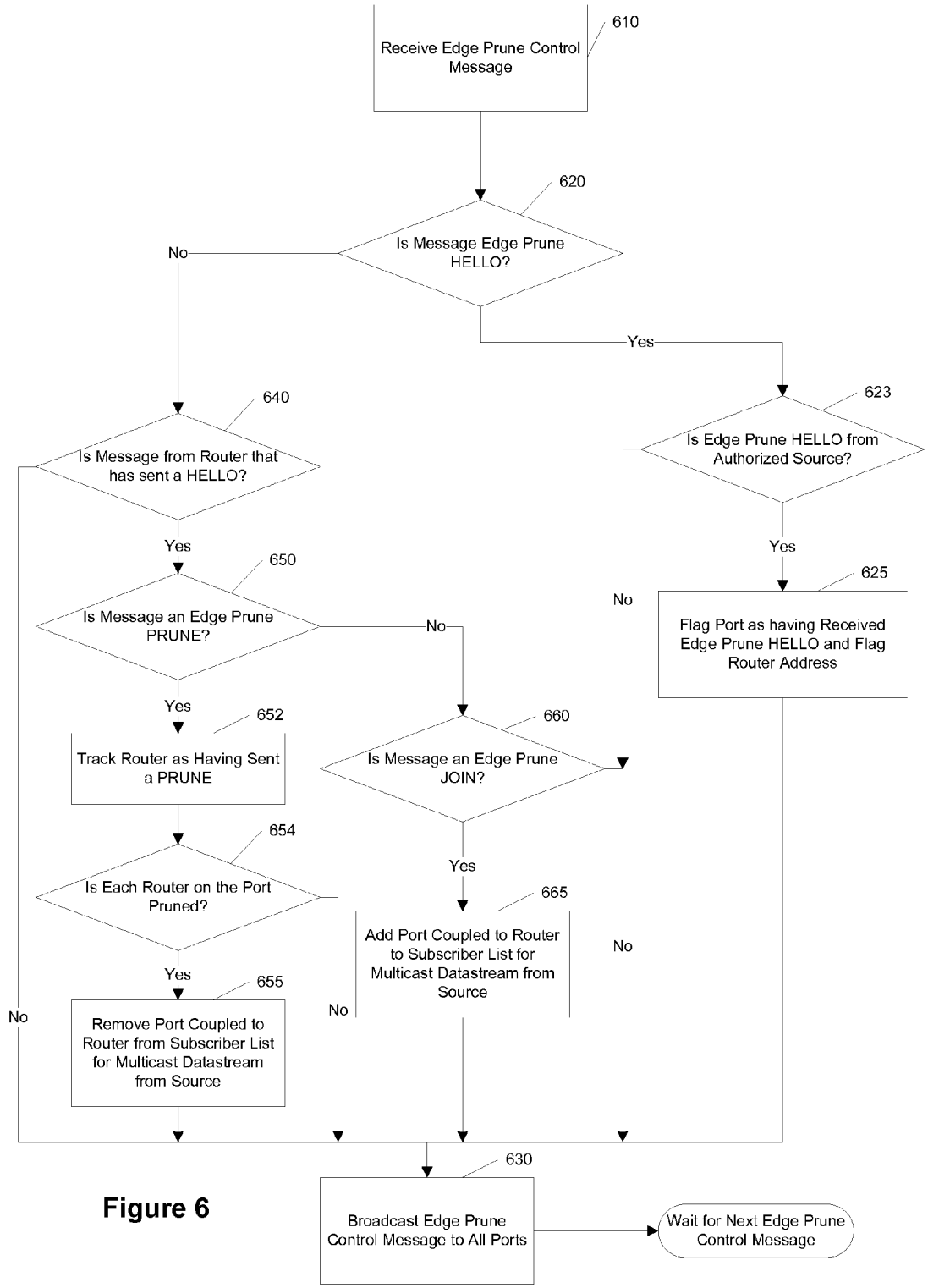
FIG. 6 is a simplified flow diagram illustrating a method implementing Edge Prune functionality in an L2 network device in accord with one embodiment of the present invention.

FIG. 6 is a simplified flow diagram illustrating a method implementing Edge Prune functionality in an L2 network device in accord with one embodiment of the present invention. The L2 network device receives an Edge Prune message from a router (610). The L2 network device can determine if the control message is an EP HELLO (620). If the control message is an EP HELLO, then the L2 device can verify that the EP HELLO control message has been received from an authorized source (623) and, if so, then flag the receiving port as having received an EP HELLO and also track the transmitting router as having sent an EP HELLO (625). The L2 device can then broadcast the Edge Prune message on all ports (630).

If the Edge Prune control message is not an EP HELLO (620), the L2 network device determines whether the Edge Prune message is from a router that has previously sent an EP HELLO (640). If not, then the L2 device can broadcast the Edge Prune message to all ports or drop the message (630). If the message is from a router that has previously sent an EP HELLO (640), then the L2 network device can determine if the Edge Prune message is an EP PRUNE (650). If an EP PRUNE, then the L2 network device can track the router as having sent an EP PRUNE (652). Such tracking can be performed using databases maintained by the L2 network device, which are used in filtering incoming multicast data streams. The L2 network device can then determine whether each router coupled to the port on which the EP PRUNE was received has sent an EP PRUNE (654). If so, then the L2 network device can remove the port connected to the router from which the message was received from a list of subscribing ports for the multicast stream (either by group destination address or group destination address with source) indicated in the EP PRUNE message in the L2 Address Table of the L2 network device (655). If the L2 network device has not received an EP PRUNE from each router coupled to the port on which the EP PRUNE was received, then the router can broadcast the control message (630).

If the message is not an EP PRUNE message (650), then the L2 network device can determine if the message is an EP JOIN (660). If an EP JOIN, then the L2 network device can add the port connected to the router to a list of subscribers for multicast data streams to the group destination address or from the corresponding source indicated by the EP JOIN message (665). In either the case of an EP PRUNE message or an EP JOIN message (or neither), the L2 network device can broadcast the Edge Prune message to all ports (630).

A L2 network device can perform the task of filtering multicast data streams in accord with EP PRUNE and EP JOIN using a variety of address identifiers derived from the EP messages. In one embodiment, a L2 network device can perform filtering based solely on the MAC address associated with the multicast group destination address. A drawback of such a filtering mechanism is since only portions of the L3 multicast GDA is included in the derived MAC address, multiple L3 multicast GDAs can map into a single L2 Address Table entry (known as "address aliasing") resulting in unwanted multicast frames being forwarded by the L2 network device. In another embodiment, a L2 network device can perform filtering based on not only the MAC address associated with the multicast GDA, but also the incoming port of the data stream. Using such a filtering method, filtering on both group and source can be accomplished since the L2 network device can learn the port associated with each coupled device. In another embodiment, a L2 network device can perform filtering based on full IPv4 or IPv6 multicast GDAs and source addresses. Such IP-level filtering requires software to analyze IP (L3 level) addresses encapsulated in L2 frames being passed by the L2 network device. Such software filtering can be more expensive in time and resources than the MAC address or MAC address plus incoming port filtering previously described since the other methods can be performed in hardware, rather than software. However, IP-level filtering can avoid the address aliasing issue.

Many currently deployed multicast routing protocols require data from an active source to be propagated past a router before information on the existence of receivers becomes available on the router. In addition, such protocols often require that this activity be repeated periodically to maintain source liveness states on the routers. PIM dense mode protocol is an example of such a protocol, as well as a PIM sparse mode protocol that uses shared trees for source discovery. In order to provide receiver interest notification for such protocols, the default mode of operation of an embodiment of the present invention can be configured such that the L2 network device periodically transmits on all potential destination addresses with the coupled routers pruning the traffic back. In other words, once an EP PRUNE message is received by an L2 network device, a timeout variable can be associated with that EP PRUNE such that once the timeout is expired, the effect of the EP PRUNE is removed from the L2 network device. Therefore, a multicast data stream that had been previously pruned from router will once again be transmitted to that router and the router given the opportunity to transmit an EP PRUNE message to once again stop the multicast data stream from being transmitted to the router.

As shown above, the present invention can be implemented using a variety of computer systems and networks. An example of one such computing and network environment is described below with reference to FIGS. 7 and 8.

An Example Computing and Network Environment

Figure 7:
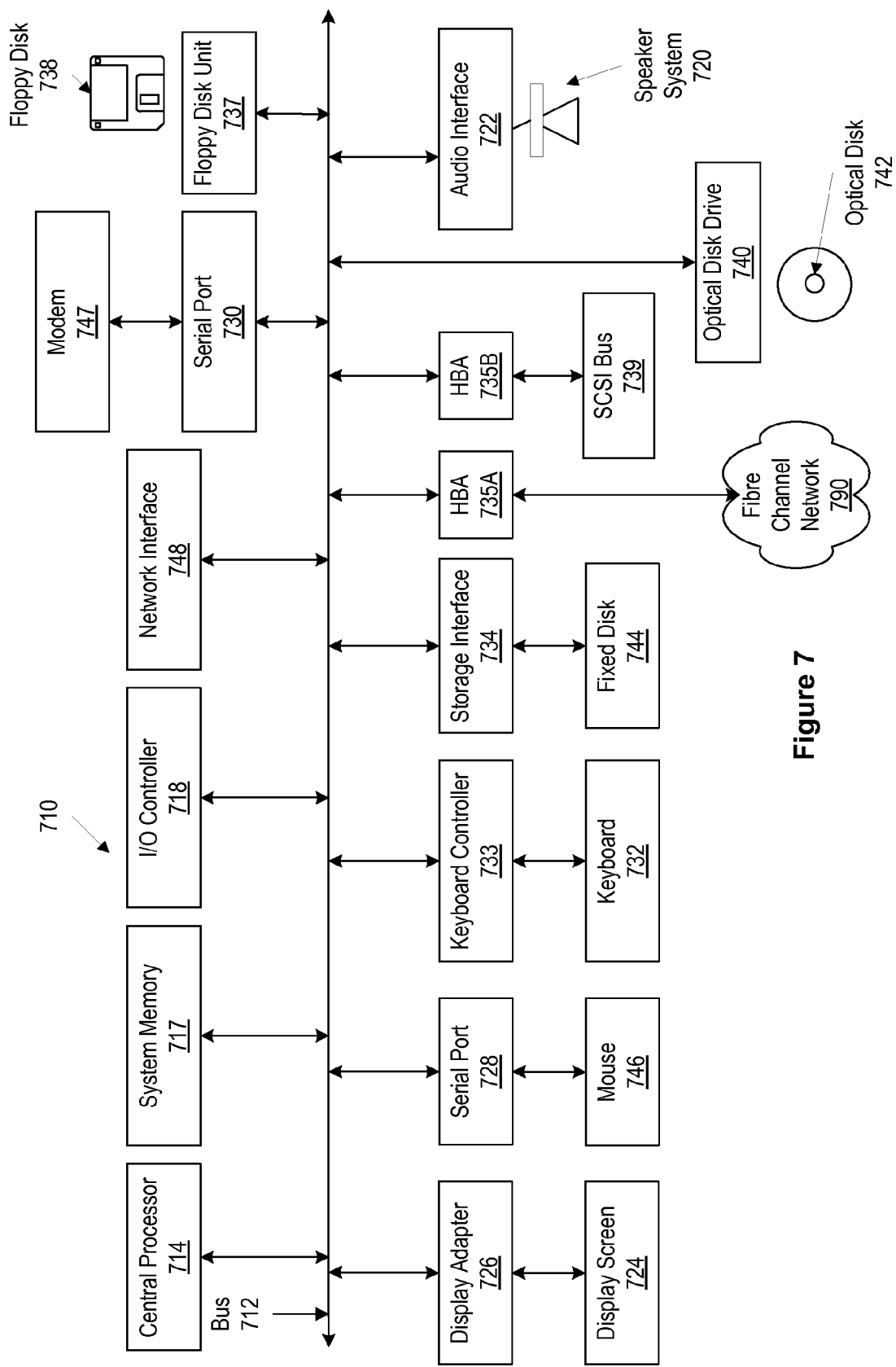
FIG. 7 is a simplified block diagram illustrating a computer system suitable for implementing embodiments of the present invention.

FIG. 7 depicts a block diagram of a computer system 710 suitable for implementing the present invention. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a fibre channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), a floppy disk unit 737, or other storage medium.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. Additionally, computer system 710 can be any kind of computing device using an operating system that provides necessary data access features and capabilities.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
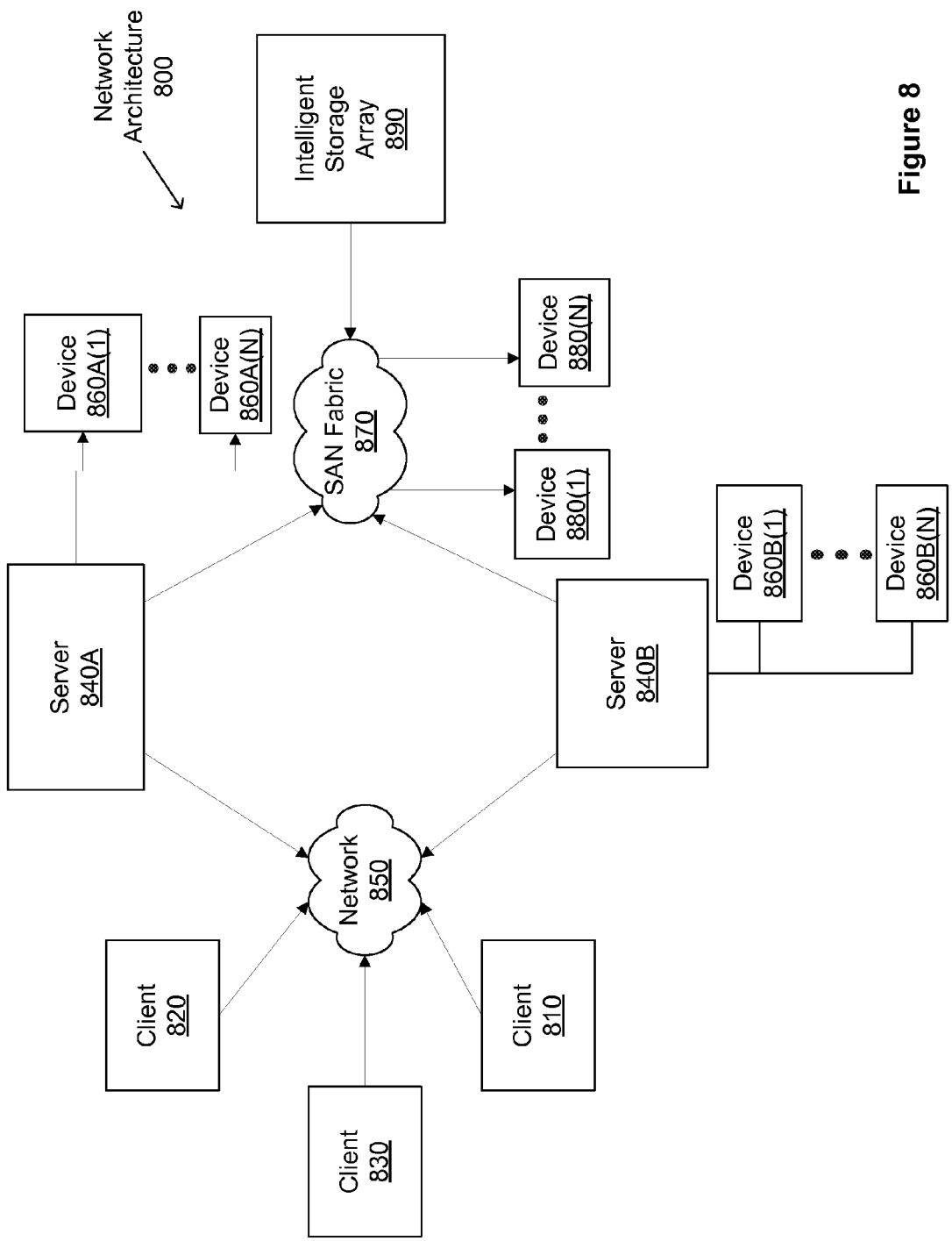
FIG. 8 is a simplified block diagram illustrating a network architecture suitable for implementing embodiments of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

An Example Router

Figure 9:
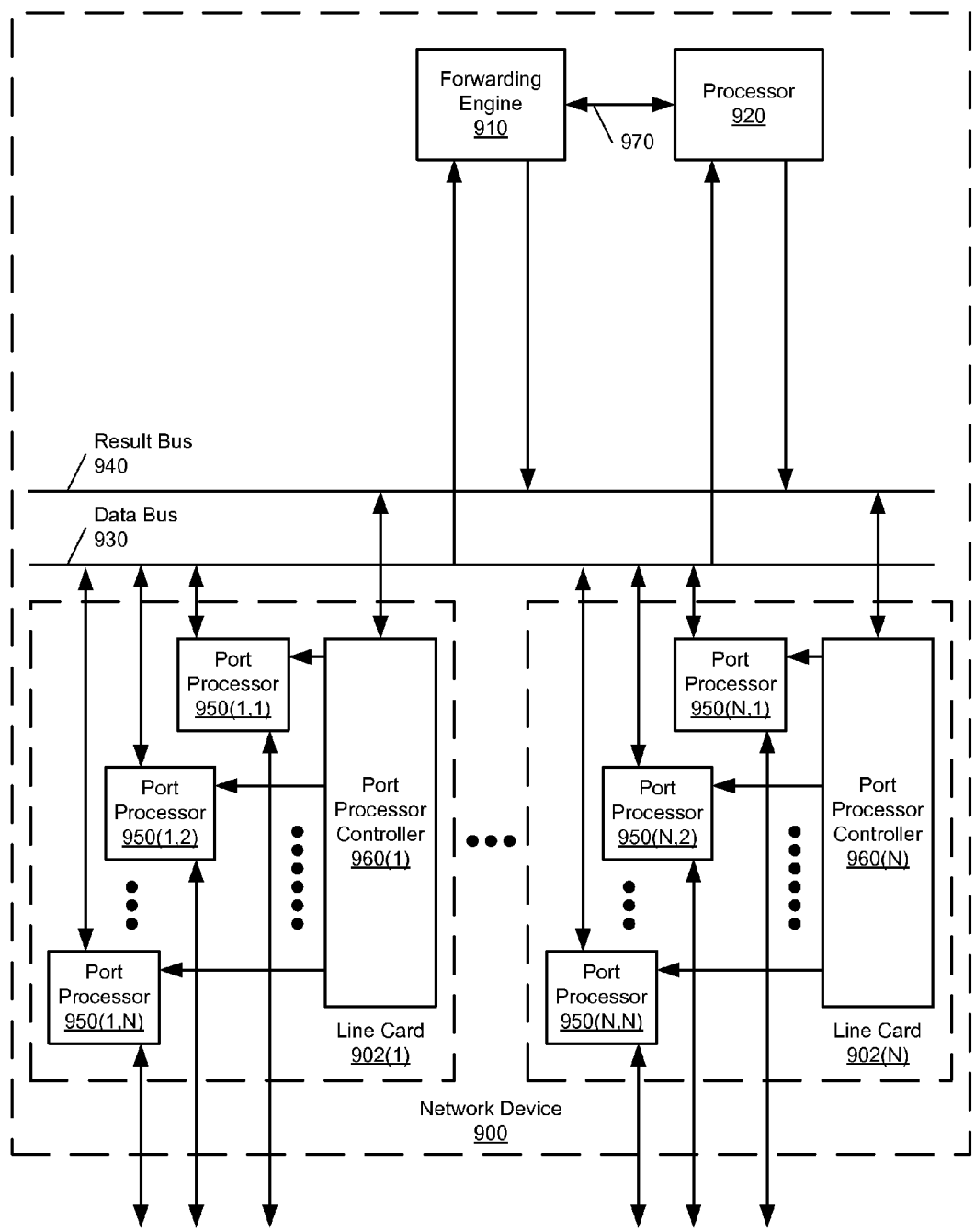
FIG. 9 is a simplified block diagram illustrating a network routing device suitable for implementing embodiments of the present invention.

FIG. 9 is a block diagram illustrating a network routing device. In this depiction, network routing device 900 includes a number of line cards (line cards 902(1)-(N)) that are communicatively coupled to a forwarding engine 910 and a processor 920 via a data bus 930 and a result bus 940. Line cards 902(1)-(N) include a number of port processors 950(1,1)-(N,N) which are controlled by port processor controllers 960(1)-(N). It will also be noted that forwarding engine 910 and processor 920 are not only coupled to one another via data bus 930 and result bus 940, but are also communicatively coupled to one another by a communications link 970.

When a packet is received, the packet is identified and analyzed by a network routing device such as network routing device 900 in the following manner, according to embodiments of the present invention. Upon receipt, a packet (or some or all of its control information) is sent from the one of port processors 950(1,1)-(N,N) at which the packet was received to one or more of those devices coupled to data bus 930 (e.g., others of port processors 950(1,1)-(N,N), forwarding engine 910 and/or processor 920). Handling of the packet can be determined, for example, by forwarding engine 910. For example, forwarding engine 910 may determine that the packet should be forwarded to one or more of port processors 950(1,1)-(N,N). This can be accomplished by indicating to corresponding one(s) of port processor controllers 960(1)-(N) that the copy of the packet held in the given one(s) of port processors 950(1,1)-(N,N) should be forwarded to the appropriate one of port processors 950(1,1)-(N,N).

In the foregoing process, network security information can be included in a frame sourced by network routing device 900 in a number of ways. For example, forwarding engine 910 can be used to detect the need for the inclusion of network security information in the packet, and processor 920 can be called into service to provide the requisite network security information. This network security information can be included in the packet during the transfer of the packet's contents from one of port processors 950(1,1)-(N,N) to another of port processors 950(1,1)-(N,N), by processor 920 providing the requisite information directly, or via forwarding engine 910, for example. The assembled packet at the receiving one of port processors 950(1,1)-(N,N) can thus be made to contain the requisite network security information.

In addition, or alternatively, once a packet has been identified for processing according to the present invention, forwarding engine 910, processor 920 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving, by a Layer 2 (L2) network device, a prune message from a first network routing element coupled to a first port of the L2 network device, wherein
   the L2 network device is coupled to a multicast source that provides a multicast data stream,
   the L2 network device is downstream from the multicast source and upstream from the first network routing element on a path of the multicast data stream, and
   the first network routing element is a first-hop network routing element from the multicast source;
   determining, by the L2 network device, if the first network routing element has transmitted a message comprising security-related information, wherein
   the message comprising the security-related information is used to inform the L2 network device that the first network routing element is capable of supporting a pruning feature;
   verifying, by the L2 network device, if the first network routing element is an authorized source of the prune message using the security-related information; and
   excluding, by the L2 network device, the first network routing element as a destination for the multicast data stream in response to receiving the prune message, if the first network routing element has transmitted the security-related information and is verified as the authorized source of the prune message.

2. The method of claim 1 wherein the prune message from the first network routing element comprises:
   information that the first network routing element is not coupled to a subscriber to the multicast data stream.

3. The method of claim 2, wherein
   the prune message identifies the multicast data stream using one or more of
   a multicast group destination address (GDA), and
   an address of the multicast source of the multicast data stream.

4. The method of claim 1 further comprising:
   excluding the first port as a destination port for the multicast data stream, if each network routing element and network element coupled to the first port is excluded as a destination for the multicast data stream.

5. The method of claim 4 further comprising:
   receiving a join message from a second network routing element coupled to the first port; and
   including the first port as the destination port for the multicast data stream in response to the join message.

6. The method of claim 5, wherein
   the join message from the second network routing element comprises information that the second network routing element is coupled to a subscriber to the multicast data stream.

7. The method of claim 6, wherein
   the join message identifies the multicast data stream using one or more of
   a multicast group destination address (GDA), and
   an address of the multicast source of the multicast data stream.

8. The method of claim 1 wherein
   the message comprising security-related information is a hello message transmitted from the first network routing element, and
   the hello message comprises the security-related information that the first network routing element supports the pruning feature.

9. The method of claim 1 further comprising:
   broadcasting the prune message.

10. A method comprising:
    determining whether a subscriber network element for a multicast frame is coupled to a port of a network routing element;
    determining whether an L2 network device coupled to a first port of the network routing element is capable of interpreting join and prune messages, wherein
    the L2 network device is coupled to a multicast source that provides the multicast frame,
    the L2 network device is downstream from the multicast source and upstream from the first network routing element on a transmission path of the multicast frame, and
    the first network routing element is a first-hop network routing element from the multicast source;
    in response to said determining that the L2 network device is capable of interpreting join and prune messages, transmitting a message comprising security-related information to the L2 network device, wherein
    the message comprising the security-related information is used to inform the L2 network device that the network routing element is capable of supporting a pruning feature; and
    in response to said determining whether the subscriber network element is coupled to the port of the network routing element and whether the L2 network device is capable of interpreting join and prune messages,
    transmitting a prune message on the first port to the L2 network device if no subscriber network element for the multicast frame is coupled to a port of the network routing element,
    transmitting a join message on the first port to the L2 network device if a subscriber network element for the multicast frame is coupled to a port of the network routing element.

11. The method of claim 10 further comprising:
    receiving the multicast frame on the first port of the network routing element.

12. The method of claim 11 wherein
    the message comprising security-related information transmitted to the L2 network device is a hello message.

13. The method of claim 12 further comprising:
    entering an identification of the L2 network device coupled to the first port onto a list of network devices capable of interpreting join and prune messages if the L2 network device is capable of interpreting the join and prune messages.

14. A Layer 2 (L2) network apparatus comprising:
    a port, wherein
    the port is configured to receive a prune message from a first network routing element coupled to the port,
    the port is configured to be a destination port for a multicast data stream,
    the L2 network apparatus is coupled to a multicast source that provides the multicast data stream,
    the L2 network apparatus is downstream from the multicast source and upstream from the first network routing element on a path of the multicast data stream, and the first network routing element is a first-hop network routing element from the multicast source; and a processor coupled to the port, wherein
the processor is configured to
determine if the first network routing element has transmitted a message comprising security-related information, wherein
the message comprising the security-related information is used to inform the L2 network apparatus that the first network routing element is capable of supporting a pruning feature,
verify if the first network routing element is an authorized source of the prune message using the security-related information, and
exclude the first network routing element as a destination for the multicast data stream, if the first network routing element has transmitted the security-related information and is verified as the authorized source of the prune message.

15. The L2 network apparatus of claim 14, wherein
the processor is further configured to exclude the port as the destination port for the multicast data stream, if each network routing element coupled to the port is excluded as a destination for the multicast data stream.

16. The L2 network apparatus of claim 15, wherein
the port is further configured to receive a join message from a second network routing element coupled to the port; and
the processor is further configured to include the port as the destination port for the multicast data stream in response to the join message.

17. A network routing apparatus comprising:
a plurality of network line cards, wherein
a first network line card of the plurality of network line cards is configured to receive a multicast frame, and
the first network line card is further configured to transmit a prune message;
a switch fabric comprising a plurality of ports, wherein
each of the plurality of ports is coupled to a corresponding one of the plurality of network line cards, and
a first port is coupled to the first network line card; and
a processor coupled to the switch fabric, wherein
the processor is configured to
determine whether a subscriber network element for the multicast frame is coupled to one of the plurality of ports;
determine whether an L2 network device coupled to the first network line card is capable of interpreting join and prune messages, wherein
the L2 network device is coupled to a multicast source that provides the multicast frame,
the L2 network device is downstream from the multicast source and upstream from the network routing apparatus on a transmission path of the multicast frame, and
the network routing apparatus is a first-hop network routing apparatus from the multicast source;
in response to said determination that the L2 network device is capable of interpreting join and prune messages, cause the first port to transmit a message comprising security-related information to the L2 network device, wherein
the message comprising the security-related information is used to inform the L2 network device that the network routing apparatus is capable of supporting a pruning feature; and
in response to said determination of whether the subscriber network element is coupled to one of the plurality of ports and whether the L2 network device is capable of interpreting join and prune messages,
cause the first port to transmit a prune message to the L2 network device coupled to the first network line card if no subscriber network element for the multicast frame is coupled to one of the plurality of ports.

18. The network routing apparatus of claim 17, wherein
the processor is further configured to cause the first port to transmit a join message to the L2 network device coupled to the first network line card if a subscriber network element for the multicast frame is coupled to one of the plurality of ports.

19. A Layer 2 (L2) network apparatus comprising:
a plurality of ports, wherein
each port of the plurality of ports is configured to receive a prune message, and
each port of the plurality of ports is configured to be a destination port for a multicast data stream;
means for receiving the prune message from a first network routing element coupled to a first port of the plurality of ports, wherein
the L2 network apparatus is coupled to a multicast source that provides the multicast data stream,
the L2 network apparatus is downstream from the multicast source and upstream from the first network routing element on a path of the multicast data stream, and
the first network routing element is a first-hop network routing element from the multicast source;
means for determining if the first network routing element has transmitted a message comprising security-related information, wherein
the message comprising the security-related information is used to inform the L2 network apparatus that the first network routing element is capable of supporting a pruning feature;
means for verifying if the first network routing element is an authorized source of the prune message using the security-related information; and
means for excluding the first network routing element as a destination for the multicast data stream in response to receiving the prune message, if the first network routing element has transmitted the security-related information and is verified as the authorized source of the prune message.

20. A network routing apparatus comprising:
a plurality of network line cards, wherein
each network line card of the plurality of network line cards is configured to receive a multicast frame, and
each network line card of the plurality of network line cards is configured to transmit a prune message;
a switch fabric comprising a plurality of ports, wherein
each of the plurality of ports is coupled to a corresponding one of the plurality of network line cards, and
a first port is coupled to a first network line card;
means for determining whether an L2 network device coupled to the first network line card is capable of interpreting join and prune messages, wherein
the L2 network device is coupled to a multicast source that provides the multicast frame,
the L2 network device is downstream from the multicast source and upstream from the network routing element on a transmission path of the multicast frame, and the network routing element is a first-hop network routing element from the multicast source;

means for transmitting a message comprising security-related information to the L2 network device, in response to said determining that the L2 network device is capable of interpreting join and prune messages, wherein the message comprising the security-related information is used to inform the L2 network device that the network routing apparatus is capable of supporting a pruning feature;

means for determining whether a subscriber network element for the multicast frame is coupled to one of the plurality of ports;

means for transmitting the prune message to the L2 network device if no subscriber network element for the multicast frame is coupled to one of the plurality of ports, in response to said determining whether the subscriber network element is coupled to one of the plurality of ports and whether the L2 network device is capable of interpreting join and prune messages, wherein the prune message is transmitted on the first network line card on which the multicast frame was received; and means for transmitting a join message to the L2 network device if a subscriber network element for the multicast frame is coupled to one of the plurality of ports, in response to said determining whether the subscriber network element is coupled to one of the plurality of ports and whether the L2 network device is capable of interpreting join and prune messages.

21. The method of claim 1 wherein the security-related information comprises at least one of a password and token.

* * * * *